April 19, 1966  R. W. EARL, JR., ET AL  3,246,537
REACTIONLESS DRIVE DEVICE
Filed Jan. 23, 1963  2 Sheets-Sheet 2
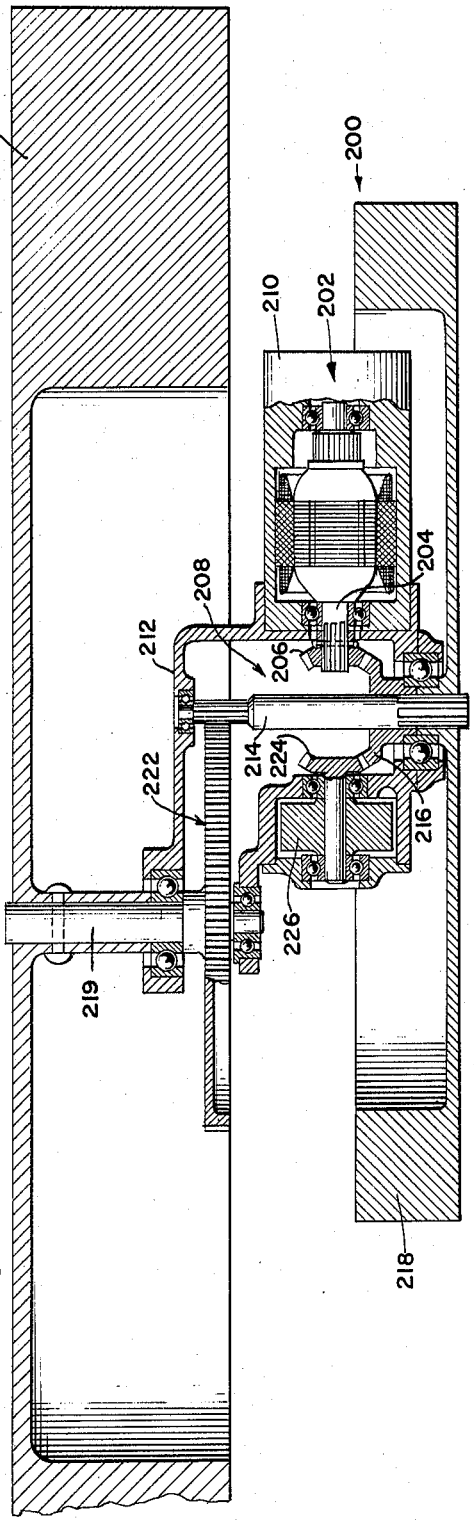
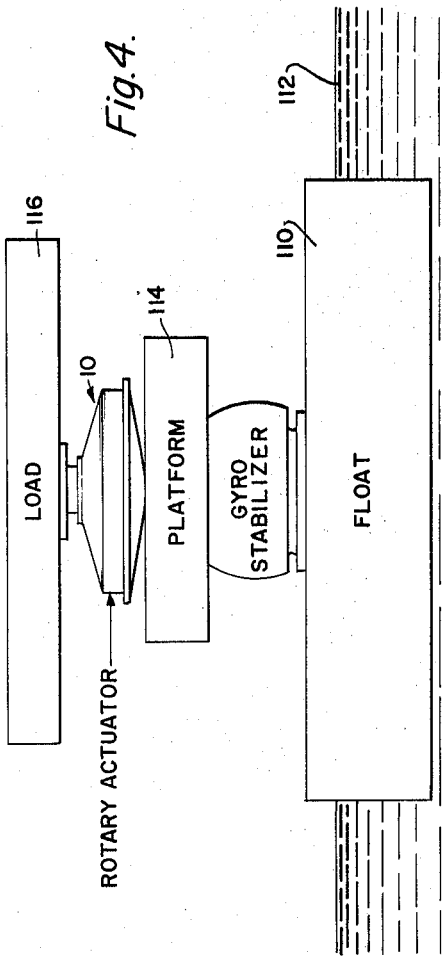
INVENTORS:
ROBERT W. EARL, JR.,
HARRY E. HOLDEN,
BY  WILLIAM H. HOUSE,
Attorney.

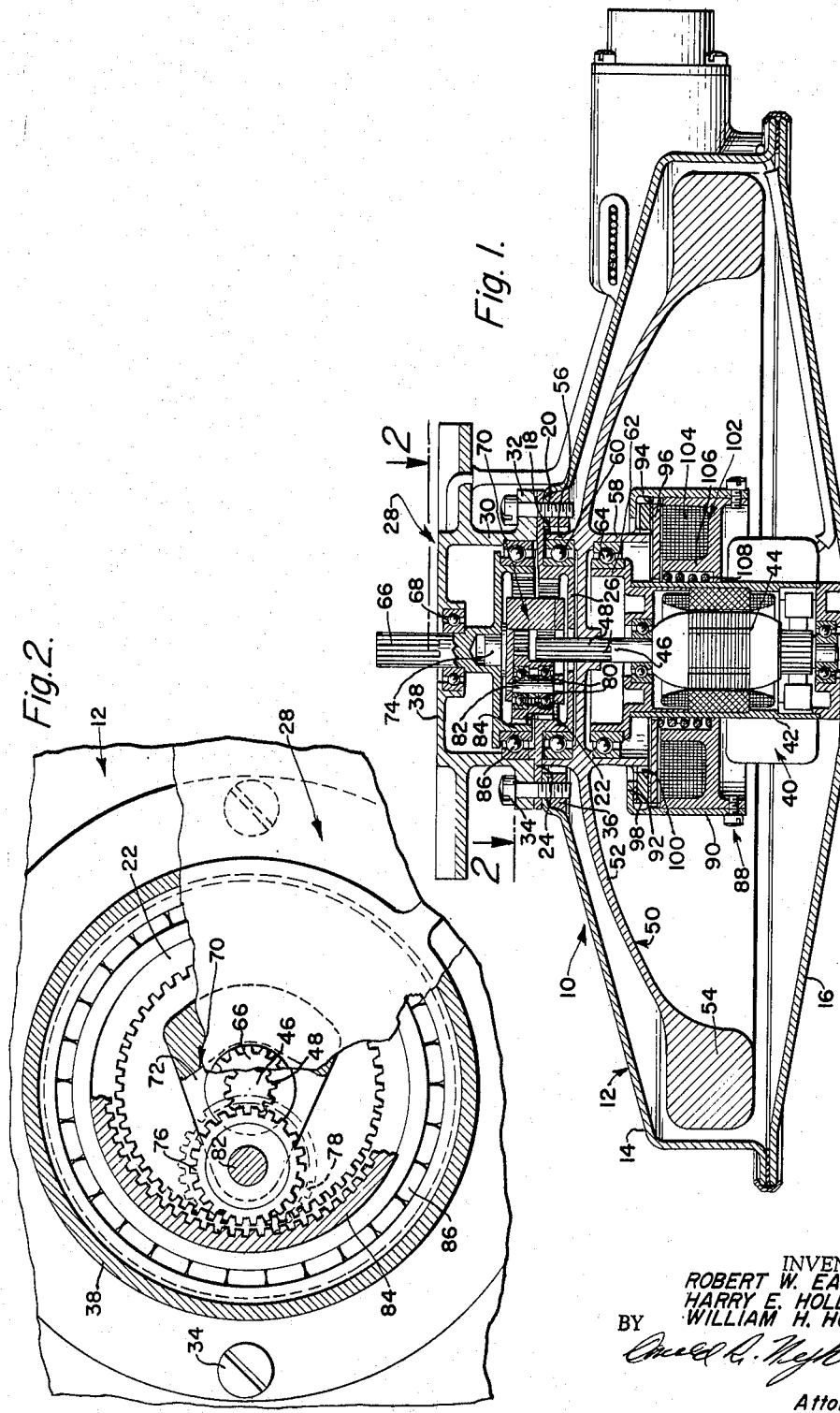

United States Patent Office 3,246,537
Patented Apr. 19, 1966

3,246,537
REACTIONLESS DRIVE DEVICE
Robert W. Earl, Jr., Palos Verdes Estates, and Harry E. Holden and William H. House, Torrance, Calif., assignors to The Garrett Corporation, Los Angeles, Calif., a corporation of California
Filed Jan. 23, 1963, Ser. No. 253,481
11 Claims. (Cl. 74—572)

This invention relates generally to the art of transmitting torque from a rotary driver to a load. The invention relates more particularly to a rotary actuator and to a method of torque transmission in which unbalanced inertial reaction torques are eliminated.

According to Newton's laws of motion, a body which exerts a force on another body is subjected to an equal and opposite reaction force. So it is that, according to the third law of angular motion, a body which exerts a torque on another body is subjected to an equal and opposite reaction torque.

Let us assume, for example, a torque transmission system composed of a supporting structure, a load rotatably supported on the structure, and a motor including a housing rigidly fastened to the structure and a rotor coupled to the load to rotate the latter. At any instant during the operation of the motor, the torque T which must be exerted on the rotor to accelerate the load in rotation is $$T = I\alpha + T_i + T_e \qquad (1)$$

where I is the resultant polar moment of the inertia of the combined mass of all of the rotating parts of the system, $\alpha$ is the angular acceleration of this combined mass, $T_i$ is the torque, opposing rotation, created by internal forces in the system, i.e. forces, such as friction, which act between the rotary and static parts of the system, and $T_e$ is the torque also opposing rotation, created by forces external to the system, i.e. forces imposed on the rotating parts of the system by a body or medium external to the system. During rotation of the load by the motor, the motor housing is subjected to a reaction torque equal and opposite to the torque T exerted on the rotor. Such reaction torque, of course, tends to rotate the motor housing and the supporting structure attached thereto in a direction opposing the direction of rotation of the load.

It is immediately evident to those skilled in the art that the internal forces which create the torque component $T_i$ in Equation 1 above produce on the supporting structure of the torque transmission system a torque which is equal and opposite to the component of reaction torque on the supporting structure resulting from the torque component $T_i$. Accordingly, the torques exerted on the static supporting structure of a torque transmisison system of the kind under discussion as the result of internal forces which act between the supporting structure and rotary parts of the system, to oppose rotation of such parts, are in equilibrium. The only unbalanced reaction torques active on the static supporting structure of such as system, therefore, result from the torque components of $I\alpha$ and $T_e$ in Equation 1 above.

In many applications of torque transmission systems of the kind under discussion, it is desirable or essential to minimize or eliminate the reaction torque on the static supporting structure of the system. Assume, for example, a float mounting a gyrostabilized platform on which is installed a rotary load of some kind driven by a rotary actuator on the platform. In this case, rotation of the load produces a reaction torque on the gyrostabilized platform which upsets the equilibrium of the gyrostabilizing mechanism. The reduction or elimination of the reaction torque on such a platform is obviously desirable, if not essential.

The only way in which the reaction torque resulting from the torque component $T_e$ in Equation 1 above can be balanced out or eliminated is by an equal and opposite torque exerted by a source external to the system. This invention is not concerned with minimizing or eliminating such externally induced recation torque. In many cases, however, the external forces which give rise to such reaction torque are negligible or zero with the result that the transmitted torque component $T_e$, and the corresponding reaction torque component are negligible or zero. This is assumed to be the case in the ensuing discussion.

With no external forces active on the rotating parts of the torque transmission system, it is evident that the reaction torque, if any, which exists in the system is created solely by the inertial torque component $I\alpha$ in Equation 1. This invention seeks to eliminate all unbalanced reaction torque resulting from such transmitted inertial torque, that is the transmitted torque necessary to accelerate or decelerate the driven mass.

A general object of the invention, then, is to provide a novel rotary actuator and a method of torque transmission wherein unbalanced inertial reaction torque on the housing of the actuator, and therefore, on static supporting structure secured to the actuator, is eliminated.

Another object of the invention is to provide a rotary actuator of the character described which is relatively simple in construction, lightweight, compact, reliable in operation, and otherwise ideally suited to its intended purposes.

Briefly, the objects of the invention are attained by providing a rotary actuator equipped with a motor which drives both a rotary output shaft to be coupled to the load and an effective rotary mass including an inertial wheel rotatable on an axis parallel to the output shaft. This wheel turns in the opposite direction to the output shaft.

The mass of the inertial wheel and its rotary speed relative to the rotary speed of the output shaft are such that when the latter is coupled to the load, the total angular momentum of the inertia wheel and the other rotary parts which turn in the same direction as the wheel equals the total angular momentum of the load and the other rotary parts which turn in the same direction as the load. Rotating in opposite directions as they do, then, the load, inertia wheel and other rotary parts create equal but opposing inertial reaction torques on the actuator housing. Accordingly, the inertial reaction torques on the actuator housing, and thus on any supporting structure secured to the housing, are in equilibrium so that there is no tendency for such housing or structure to rotate during changes in speed of the load.

According to the preferred practice of the invention, the inertia wheel is geared to rotate faster than the load, thereby to permit the mass of the inertia wheel to be minimized while maintaining the inertial reaction torque balance in the actuator.

A better understanding of the invention may be had from the following detailed description thereof taken in connection with the attached drawings, wherein:

FIG. 1 is an axial section through a present preferred embodiment of the invention;

FIG. 2 is an enlarged section taken on line 2—2 in FIG. 1;

FIG. 3 is a section through an alternative form of the invention;

FIG. 4 diagrammatically illustrates one application of the invention.

In FIGS. 1 and 2 of these drawings there is illustrated a balanced rotary actuator 10 according to the invention. Actuator 10 comprises a circular hollow housing 12 including a part 14 having an open side sealed by a cover 16. In the opposite side of housing part 14 is a coaxial circular opening 18 encircled by a flange 20 on part 14.

Within the housing opening 18 is a coaxial ring gear 22 from one end of which projects a flange 24 in a plane normal to the common axis of the ring gear 22 and housing 12. Flange 24 seats on the outer surface of the housing flange 20. Extending across the opposite end of the ring gear 22 is a wall 26.

Outwardly of the ring gear 22 is a coaxial bearing retainer 28. Bearing retainer 28 comprises a cylindrical wall 30 terminating at one end in an outwardly directed flange 32 which seats against the outer surface of the ring gear flange 24. The ring gear 22 and bearing retainer 28 are firmly attached to the actuator housing 12 by bolts 34 which extend through the housing flange 20, the ring gear flange 24, and the bearing retainer flange 32 and are threaded in a clamping ring 36 seating against the under surface of the housing flange 20. Extending across the outer end of the bearing retainer is a wall 38.

Coaxially positioned within the actuator housing 12 is an electrical motor 40 including a housing 42 which is rigidly attached to one end of the housing cover 16 in any convenient way. Rotatably supported in the motor housing 42 is the rotor 44 of the motor. Rotor 44 includes a shaft 46 projecting beyond the end of the motor housing and through a central hole in the ring gear wall 26. Shaft 46 is formed with axially extending gear teeth 48 which extend a substantial distance along the shaft, as shown. Fitted on the motor shaft 46 below the ring gear 22 is an inertia wheel 50. Wheel 50 is keyed for rotation with the motor shaft by splines (not shown) on the wall of the shaft-receiving bore in the wheel meshing with the shaft teeth 48. Inertia wheel 50 includes a dished web 52 terminating at its outer edge in a relatively massive ring 54. Projecting from the opposite sides of the inertia wheel web 52, adjacent the center of the wheel, are coaxial flanges 56 and 58. Wheel flange 56 surrounds the ring gear 22 and is rotatably supported on the latter by bearing 60. Wheel flange 58 surrounds a flange 62 on the motor housing 42 and is rotatably supported on the latter flange by a bearing 64. Inertia wheel 50 thus rotates with and turns in the same direction as the motor shaft 46.

The rotary output shaft 66 of the actuator extends through a central opening in the bearing retainer wall 38 and is rotatably supported in this opening by a bearing 68. Drivably connecting the motor shaft 46 to the output shaft 66 is reduction gearing 70 which rotates the output shaft in the opposite direction to the inertia wheel 50 with a predetermined ratio of shaft speed to wheel speed, for reasons to be seen. Gearing 70 illustrated in the drawings comprises an epicyclic gear train which includes, in addition to the ring gear 22, a planetary gear carrier 72. The carrier 72 is rotatably supported by bearings 74 and is formed with a central opening through which the motor shaft 46 extends, as shown.

Rotatably supported on the gear carrier 72, for rotation about a common axis laterally offset from the common axis rotation of the carrier and the motor shaft 46 are planet gears 76 and 78. These gears are rotatably supported on the carrier by bearings 80, the inner races of which support a common supporting shaft 82 to which the gears 76 and 78 are rigidly secured. Planet gear 76 meshes with the ring gear 22. Planet gear 78 meshes with a ring gear 84 rigid on the output shaft 66. This latter ring gear is rotatably supported in the bearing retainer 28 by a bearing 86.

The number of teeth on each of the gears 22, 76, 78 and 84 in the reduction gear train 70 are such that the inertia wheel 50 and the output shaft 66 are driven in opposite directions of rotation with a ratio of shaft speed to wheel speed of less than unity.

Indicated at 88 is a brake for the rotary parts of the actuator. Brake 88 comprises a cylindrical housing 90 surrounding and secured to the upper end of the motor housing 42. The upper end of the brake housing is turned in to provide a flange 92. Formed on the inner surface of the brake housnig 90, adjacent its upper end, are splines 94. An annular friction brake disc 96 within the housing 90 has its periphery serrated to interengage the splines 94, whereby brake disc 96 can move axially but cannot rotate in the brake housing.

Between the brake disc 96 and the brake housing flange 92 is a second annular friction brake disc 98 which can move axially and freely rotate in the brake housing. The inner edge of this second disc is serrated to engage splines 100 on the outside of the inertia wheel flange 58, whereby the brake disc 98 can move axially with respect to, but is keyed to rotate with the inertia wheel 50.

Within the brake housing 90 is an annular electromagnet 102 including a coil 104 and a magnetically permeable core 106. The electromagnet 102, when energized, attracts the brake disc 96, which comprises a magnetically permeable material, against the action of a coil spring 108. Spring 108 normally urges the brake disc 96 to a position in which the brake disc 98 is frictionally gripped between the brake disc 96 and the brake housing flange 92. In this position, the brake disc 96, and thereby all of the rotary parts of the actuator, are restrained against rotation. When the electromagnet 102 is energized, the brake disc 96 is attracted toward the magnet, thereby releasing the brake.

In operation of the actuator, the motor 40, when energized with the brake 88 released, drives the inertia wheel 50 and the output shaft 66 in counter directions of rotation. The inertia wheel rotates at motor speed while the output shaft rotates at a predetermined slower speed than motor speed determined by the ratio of the reduction gearing 70. Re-engagement of the brake 88 by de-energizing of the brake electromagnet 102 brings the rotating parts of the actuator to an abrupt stop.

The present rotary actuator may be used whenever it is desired or essential to drive a load in rotation without an inertial reaction torque on the static supporting structure for the actuator. In FIG. 4, for example, numeral 110 denotes a float supported in a body of water 112 and the numeral 114 denotes a gyrostabilized and oriented platform on the float. Above this platform is a load 116 to be reversibly driven and positioned in rotation on a vertical axis. By way of example, load 116 might comprise a scanning antenna array which is controlled from and transmits information received to a remote control station (not shown) via a radio transmitter-receiver (not shown).

Now it is obvious that if the load 116 were driven in rotation by a conventional rotary actuator, the inertial reaction torque developed during changes in the rate or direction of rotation of the device 116 would act on the relatively static supporting structure for the actuator, i.e. the float 110 and platform 114. Such reaction torque would upset the equilibrium of the gyrostabilizing mechanism for the platform. This would occur, of course, each time the load 116 was accelerated, decelerated, or reversed.

Inertial reaction torque is eliminated in the present rotary actuator. Thus, according to the present invention, the actuator 10 is designed so that for the particular load to be driven by the actuator, the combined polar moment of inertia, and hence the combined angular momentum of the load and the rotary parts of the actuator which turn in the same direction as the load are exactly equal at every speed to the combined polar moment of inertia and angular momentum of the inertia wheel 50 and the other rotary parts of the actuator which turn in the same direction as the inertia wheel. In this way, during each change in speed or direction of rotation of the actuator, two equal but opposing inertial reaction torques are exerted on the actuator housing 12, and any static supporting structure secured thereto. Accordingly, the two reaction torques balance one another with the result that the actuator housing and its supporting structure are not subjected to any net or unbalanced inertial reaction torque.

This balance of inertial reaction torques for any particular load to be driven is attained by properly proportioning and weighting the inertia wheel 50 to achieve the balance. It is obvious that one particularly important advantage of the present invention is that the inertial reaction torque balance is attained, with a rotary actuator of minimum overall size and weight, by virtue of the fact that the inertia wheel 50 is driven faster than the load and therefore may be reduced in size and weight with respect to the load. The smaller the ratio of output shaft or load speed to inertia wheel speed, the smaller and lighter may be the inertia wheel, and, thereby, the overall actuator. In an experimental model of the present actuator, for example, the ratio of shaft speed to inertia wheel speed was 1:100 thus permitting the use of a relatively small, lightweight inertia wheel with a relatively massive load.

It is obvious that while in the actuator described above, the inertia wheel 50 turns on the axis of rotation of the load, for convenience, this coincidence of rotation axes is not essential. It is only essential that the rotation axis of the inertia wheel and the rotation axis of the load be substantially parallel. These axes may be laterally offset, for example.

The present inertial reaction torque balanced actuator may assume other forms than that shown in FIGS. 1 and 2, of course. The modified actuator 200 shown in FIG. 3, for example, comprises a motor 202 whose shaft 204 is coupled to one bevel gear 206 of a reduction gear train 208 and whose housing 210 is mounted on the actuator housing 212. In this case, a shaft 214 of the actuator turns on an axis at right angles to the motor axes and is drivably coupled to a bevel gear 216 in the gear train 208. The inertia wheel 218 of the actuator is coupled to the shaft 214. Shaft 214, in turn, is drivably coupled to the load 220 to be driven by reduction gearing 222. In this form of the invention, the inertia wheel 218 and load 222 will be observed to rotate on parallel offset axes.

When the motor 202 is energized, the load 220 and inertia wheel 218 are driven in counter directions of rotation and the inertia wheel turns faster than the load as before. The inertia wheel is proportioned to attain the same inertial reaction torque balance as in the first form of the invention.

It is obvious that the rotor of motor 202 and bevel gear 206, and the bevel gear 224 of gear train 208 turn in opposite directions of rotation at the same angular velocity and thereby create opposing inertial reaction torques about the motor axis. This latter reaction torques may or may not balance, however, depending upon the moments of inertia of these counter-rotating parts. In some cases, a balance of inertial reaction torques on the motor axis in FIG. 3 may be unnecessary. If such a balance is required, however, it can easily be attained by providing a second inertia wheel 226 on gear 224, as shown, and properly weighting the counter-rotating parts to afford them with equal net moments of inertia.

The invention herein described and illustrated is thus fully capable of attaining the objects and advantage preliminarily set forth.

While certain presently preferred embodiments of the invention have been disclosed, numerous modifications of the invention are possible within its spirit and scope.

We claim:

1. In a torque transmission system, the combination of:
   a supporting structure;
   a rotary output shaft on said structure arranged to be coupled to a load for driving the latter in rotation on a given axis;
   a rotary inertia wheel on said structure rotatable on an axis substantially parallel to said given axis; and
   power means secured to said structure and having a power output shaft for simultaneously driving said rotary output shaft and wheel in opposite directions of rotation with a constant ratio of rotary output speed to wheel speed,
   said wheel having a polar moment of inertia bearing a predetermined ratio to the polar moment of inertia of the load such that the net inertial reaction torque on said structure during rotation of said load is substantially zero.

2. In a torque transmission system, the combination of:
   a supporting structure;
   a rotary output shaft on said structure arranged to be coupled to a load for driving the latter in rotation on a given axis;
   a rotary inertia wheel on said structure rotatable on an axis substantially parallel to said given axis; and
   power means secured to said structure and having a power output shaft for simultaneously driving said rotary output shaft and wheel in opposite directions of rotation with a constant speed ratio less than unity of rotary output shaft speed to wheel speed,
   said wheel having a polar moment of inertia bearing a predetermined ratio to the polar moment of inertia of the load such that the net inertial reaction torque on said structure druing rotation of said load is substantially zero.

3. A rotary actuator, comprising:
   a housing;
   an output shaft rotatably mounted on said housing;
   an inertia wheel rotatable in said housing on an axis coincident to the axis of said shaft;
   a motor in said housing; and
   means drivably connecting said motor to said shaft and wheel for simultaneous rotation of the shaft and wheel by said motor in opposite directions with a constant ratio between the angular velocity of said shaft and the angular velocity of said wheel.

4. A rotary actuator, comprising:
   a housing;
   a motor in said housing including a motor housing secured to said actuator housing and a rotor having a shaft;
   a rotary output shaft in said actuator housing coaxial with said motor shaft;
   an inertia wheel fixed to said motor shaft for rotation therewith; and
   gearing drivably coupling said motor shaft to said output shaft for rotation of the latter simultaneously with said wheel but in a direction opposite to the direction of rotation of said wheel.

5. The subject matter of claim 4 wherein:
   said gearing comprises a speed reduction gear train whereby the ratio of the angular velocity of said output shaft to the angular velocity of said wheel is less than unity.

6. A rotary actuator, comprising:
   a housing;
   a first rotary shaft on said housing;
   an inertia wheel coupled to said shaft for rotation with said shaft;
   first gear means fixed to said shaft;
   a motor having a shaft normal to the axis of said rotary shaft;
   second gear means fixed to said motor shaft and meshing said first gear means to drive said first shaft;
   a rotary output shaft mounted on said housing parallel to first shaft; and
   means drivably coupling said first shaft to said output shaft for rotation of said output shaft by and in a direction opposite to the direction of rotation of said first shaft.

7. In combination in a torque transmission system:
a supporting structure;
first rotary means on said structure which rotate in one direction for the transmission of a torque by said system; and
second rotary means on said structure drivably coupled to said first means for simultaneous rotation of said first and second means in opposite directions on parallel axes at relative accelerations such that the inertial reaction torque produced on said structure by acceleration of said first means is substantially equal and opposite to the inertial reaction torque produced on said structure by acceleration of said second means.

8. The subject matter of claim 7 wherein:
the total effective mass inertia of one of said means is less than the total effective mass inertia of the other means and the angular acceleration of said one means is greater than the angular acceleration of said other means.

9. In a torque transmission system, the combination of:
a supporting structure;
a rotary output shaft on said structure arranged to be coupled to a load for driving the latter in rotation on a given axis;
a rotary inertia wheel on said structure rotatable on an axis coincident with said given axis; and
means on said structure for driving said shaft and wheel simultaneously in opposite directions of rotation with a constant ratio of shaft speed to wheel speed.

10. In a torque transmission system, the combination of:
a supporting structure;
a rotary output shaft on said structure arranged to be coupled to a load for driving the latter in rotation on a given axis;
a rotary inertia wheel on said structure rotatable on an axis coincident with said given axis; and
means on said structure for driving said shaft and wheel simultaneously in opposite directions with a constant ratio of less than unity of shaft speed to wheel speed.

11. A rotary actuator, comprising:
a housing;
a first rotary shaft on said housing;
an inertia wheel coupled to said shaft for rotation with said shaft;
first gear means fixed to said shaft;
a motor having a shaft normal to the axis of said rotary shaft;
second gear means fixed to said motor shaft and meshing with said first gear means to drive said first shaft;
a rotary output shaft mounted on said housing parallel to said first shaft;
means drivably coupling said first shaft to said output shaft for rotation of said output shaft thereby and in a direction opposite to the direction of rotation of said first shaft; and
a second inertia wheel drivably coupled to said motor shaft for rotation of said second inertia wheel and motor shaft in opposite directions on parallel axis, the respective inertial reaction torques of said second inertia wheel and motor shaft being substantially equal and oppositely directed.

References Cited by the Examiner
UNITED STATES PATENTS

| | | | |
|---|---|---|---|
| 703,724 | 7/1902 | Gibbs | 74—572 |
| 769,693 | 9/1904 | Forbes | 74—5.22 |
| 1,646,126 | 10/1927 | Tuttle | 74—788 |
| 1,945,874 | 2/1934 | Weaver | 74—5.22 |
| 1,981,167 | 11/1934 | Frost | 74—572 |
| 2,084,429 | 6/1937 | Bussien | 180—43 |
| 2,143,854 | 1/1939 | Baker | 310—83 |
| 2,734,383 | 2/1956 | Paine | 74—5.22 |
| 3,039,096 | 6/1962 | Bosch et al. | 74—1 |

BROUGHTON G. DURHAM, *Primary Examiner.*